(12) United States Patent
Lee et al.

(10) Patent No.: US 10,582,442 B2
(45) Date of Patent: Mar. 3, 2020

(54) METHOD AND APPARATUS FOR RECEIVING SYSTEM INFORMATION AND PAGING IN SHORT TTI IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 15/567,236

(22) PCT Filed: Apr. 29, 2016

(86) PCT No.: PCT/KR2016/004497
§ 371 (c)(1),
(2) Date: Oct. 17, 2017

(87) PCT Pub. No.: WO2016/175596
PCT Pub. Date: Nov. 3, 2016

(65) Prior Publication Data
US 2018/0109994 A1 Apr. 19, 2018

Related U.S. Application Data

(60) Provisional application No. 62/154,131, filed on Apr. 29, 2015.

(51) Int. Cl.
*H04W 84/18* (2009.01)
*H04L 5/14* (2006.01)
(Continued)

(52) U.S. Cl.
CPC .......... *H04W 48/12* (2013.01); *H04W 48/16* (2013.01); *H04W 68/005* (2013.01); *H04W 72/1205* (2013.01)

(58) Field of Classification Search
CPC . H04W 48/12; H04W 72/1205; H04W 48/16; H04W 68/005
See application file for complete search history.

(56) References Cited

U.S. PATENT DOCUMENTS

2009/0296833 A1* 12/2009 Sawahashi ............ H04L 1/0007
375/260
2011/0032925 A1* 2/2011 Lee ........................ H04L 1/1621
370/345

(Continued)

FOREIGN PATENT DOCUMENTS

WO 2014/060010 A1 4/2014
WO 2014/124164 A1 8/2014

OTHER PUBLICATIONS

Huawei et al., "Motivation of New SI Proposal Latency Reduction", RP-150238, 3GPP TSG RAN Meeting #67, Shanghai, China, Mar. 9-12, 2015, pp. 3-9.

(Continued)

*Primary Examiner* — Brian S Roberts
*Assistant Examiner* — Abusayeed M Haque
(74) *Attorney, Agent, or Firm* — Dentons US LLP (57) ABSTRACT

A method and apparatus for receiving system information in a wireless communication system is provided. A user equipment (UE) receives an indication indicating whether a cell supports a short transmission time interval (TTI) from the cell, and receives at least one of normal TTI system information in a normal TTI or short TTI system information in the short TTI from the cell according to the received indication. That is, an eNodeB (eNB) may schedule separate system information block type 1 (SIB1) and/or SI messages broadcast in short TTI.

11 Claims, 9 Drawing Sheets

(51) Int. Cl.
  *H04L 12/801* (2013.01)
  *H04W 48/12* (2009.01)
  *H04W 68/00* (2009.01)
  *H04W 48/16* (2009.01)
  *H04W 72/12* (2009.01)

(56) References Cited

U.S. PATENT DOCUMENTS

| | | | |
|---|---|---|---|
| 2011/0134757 A1* | 6/2011 | Lin | H04W 72/085 370/241 |
| 2011/0292858 A1* | 12/2011 | Jones | H04W 72/005 370/312 |
| 2014/0071954 A1 | 3/2014 | Au et al. | |
| 2014/0293843 A1* | 10/2014 | Papasakellariou | H04W 72/042 370/280 |
| 2015/0188650 A1* | 7/2015 | Au | H04J 3/1694 370/312 |
| 2015/0282130 A1* | 10/2015 | Webb | H04L 1/08 370/329 |
| 2016/0249329 A1* | 8/2016 | Au | H04W 48/00 |
| 2016/0278088 A1* | 9/2016 | Cheng | H04L 47/27 |

OTHER PUBLICATIONS

Ericsson et al., "New SI proposal: Study on Latency reduction techniques for LTE", RP-150465, 3GPP TSG RAN Meeting #67, Shanghai, China, Mar. 9-12, 2015, pp. 3-5.

\* cited by examiner

METHOD AND APPARATUS FOR RECEIVING SYSTEM INFORMATION AND PAGING IN SHORT TTI IN WIRELESS COMMUNICATION SYSTEM

CROSS-REFERENCE TO RELATED APPLICATIONS

This application is the National Stage filing under 35 U.S.C. 371 of International Application No. PCT/KR2016/004497, filed on Apr. 29, 2016, which claims the benefit of U.S. Provisional Application No. 62/154,131 filed on Apr. 29, 2015, the contents of which are all hereby incorporated by reference herein in their entirety.

BACKGROUND OF THE INVENTION

Field of the Invention

The present invention relates to wireless communications, and more particularly, to a method and apparatus for receiving system information and paging in a short transmission time interval (TTI) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. In the 3GPP, much effort has been put into increasing data rates from the first release of LTE (Rel-8) until the most recent one (Rel-12). However, with regard to further improvements specifically targeting the delays in the system little has been done.

Packet data latency is important not only for the perceived responsiveness of the system, but it is also a parameter that indirectly influences the throughput. In addition, to achieve really high bit rates, UE L2 buffers need to be dimensioned correspondingly. The longer the round trip time (RTT) is, the bigger the buffers need to be. The only way to reduce buffering requirements in the UE and eNB side is to reduce latency. Further, radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency, e.g. reduced transmission time (TTI) and processing time, contention based physical uplink shared channel (CB-PUSCH) transmission, etc., have been discussed.

SUMMARY OF THE INVENTION

The present invention provides a method and apparatus for receiving system information and paging in a short transmission time interval (TTI) in a wireless communication system. The present invention provides a method and apparatus for scheduling separate system information (SI) messages broadcast in a short TTI. The present invention provides a method and apparatus for indicating support of short TTI.

In an aspect, a method for receiving, by a user equipment (UE), system information in a wireless communication system is provided. The method includes receiving an indication indicating whether a cell supports a short transmission time interval (TTI) from the cell, and receiving at least one of normal TTI system information in a normal TTI or short TTI system information in the short TTI from the cell according to the received indication.

In another aspect, a method for transmitting, by a mobility management entity (MME), a paging message in a wireless communication system is provided. The method includes storing UE information on support for a short transmission time interval (TTI), and transmitting a paging message including the UE information on support for the short TTI to an eNodeB (eNB).

SI messages and paging can be provided efficiently in a short TTI.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
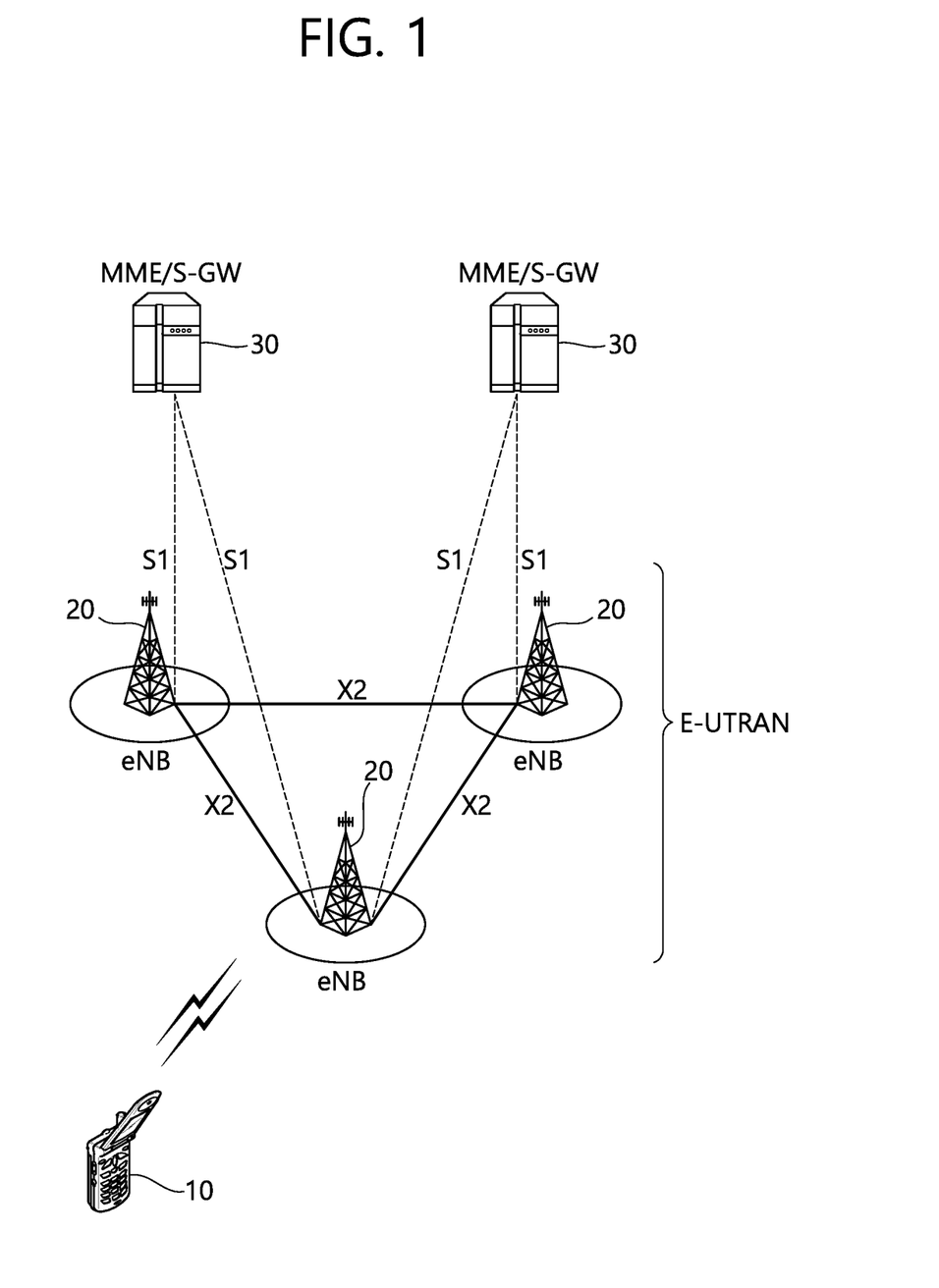
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
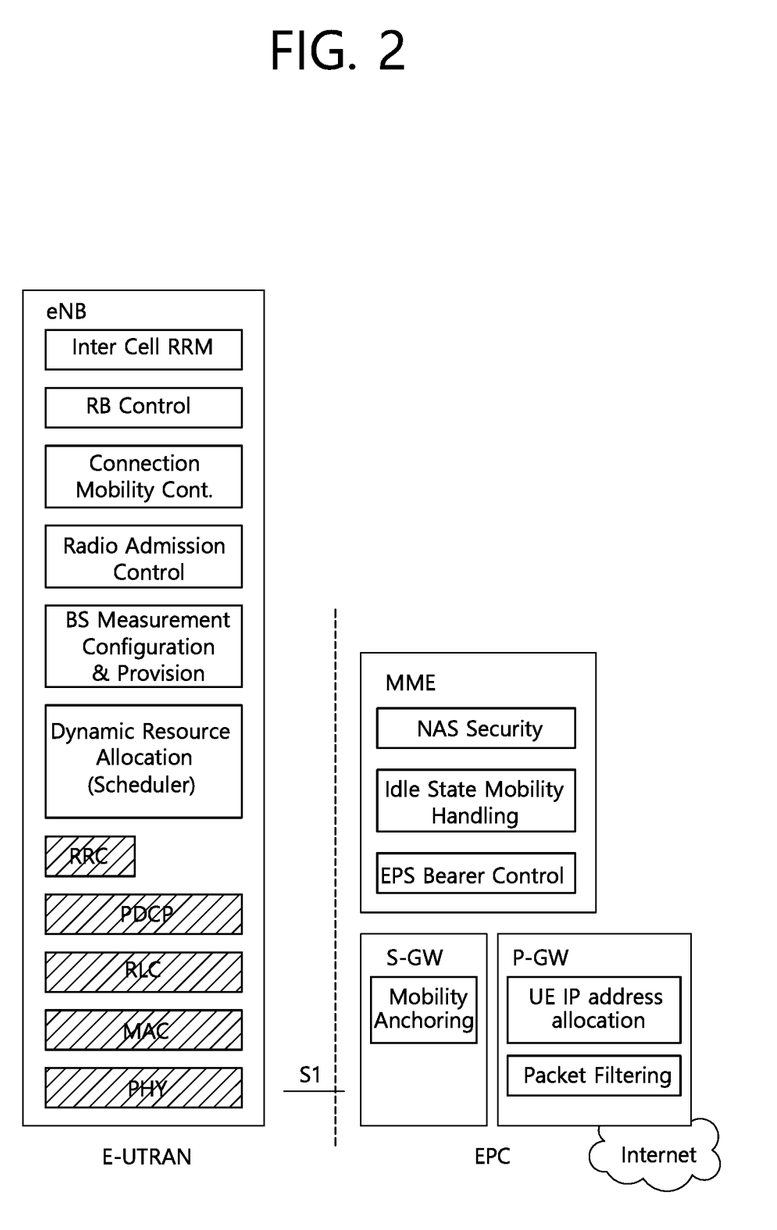
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
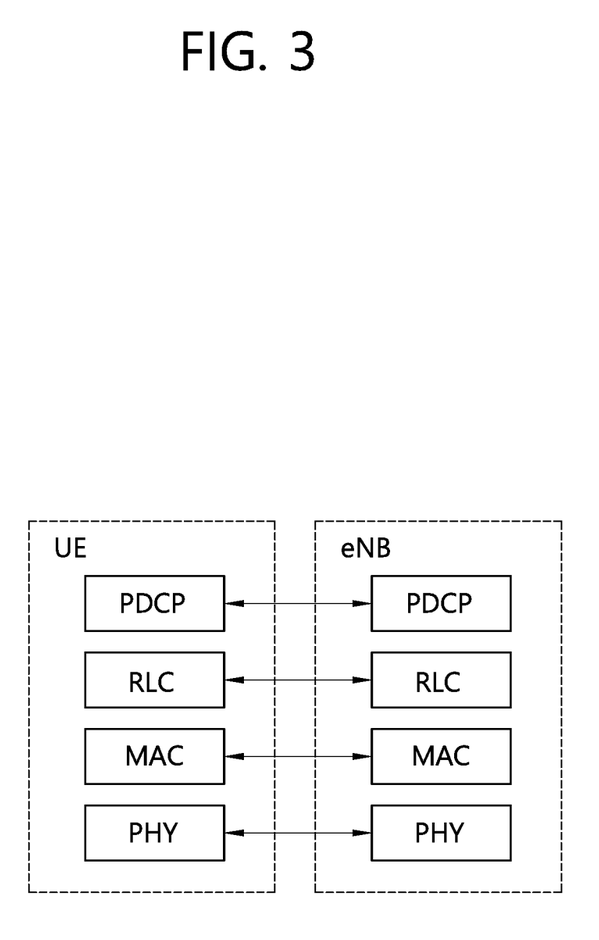
FIG. 3 shows a block diagram of a user plane protocol stack of an LTE system.
Figure 4:
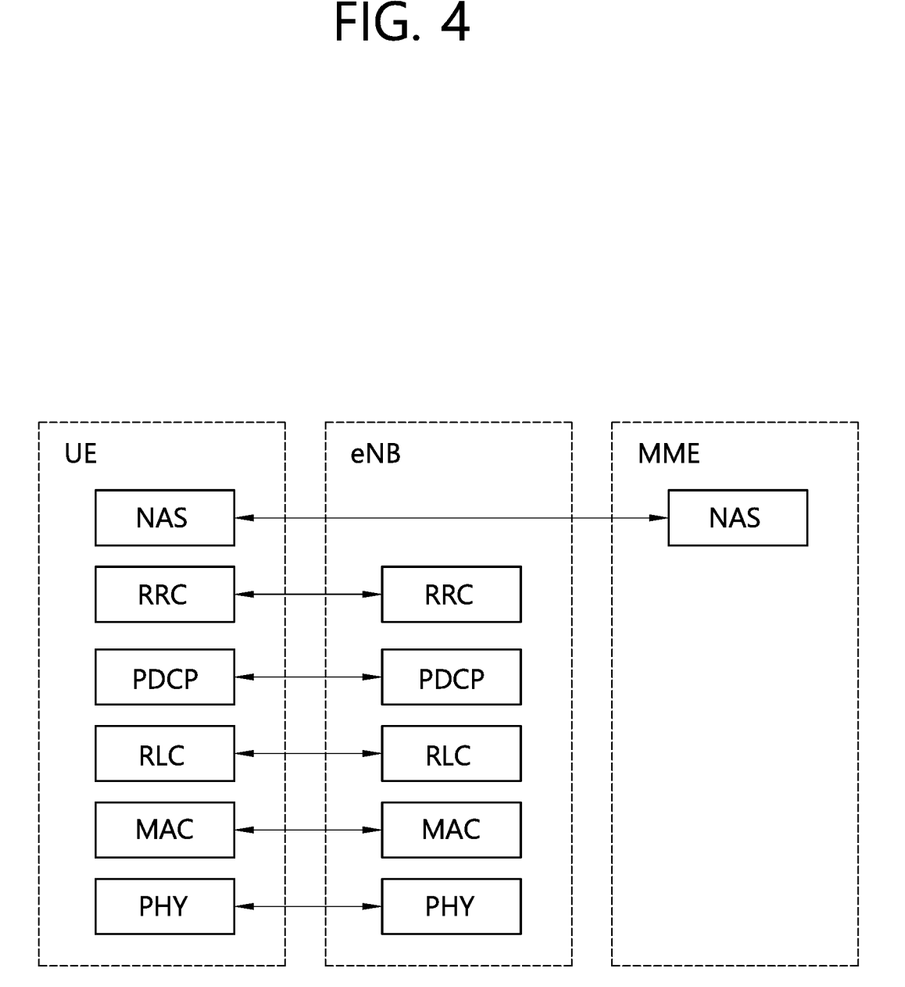
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
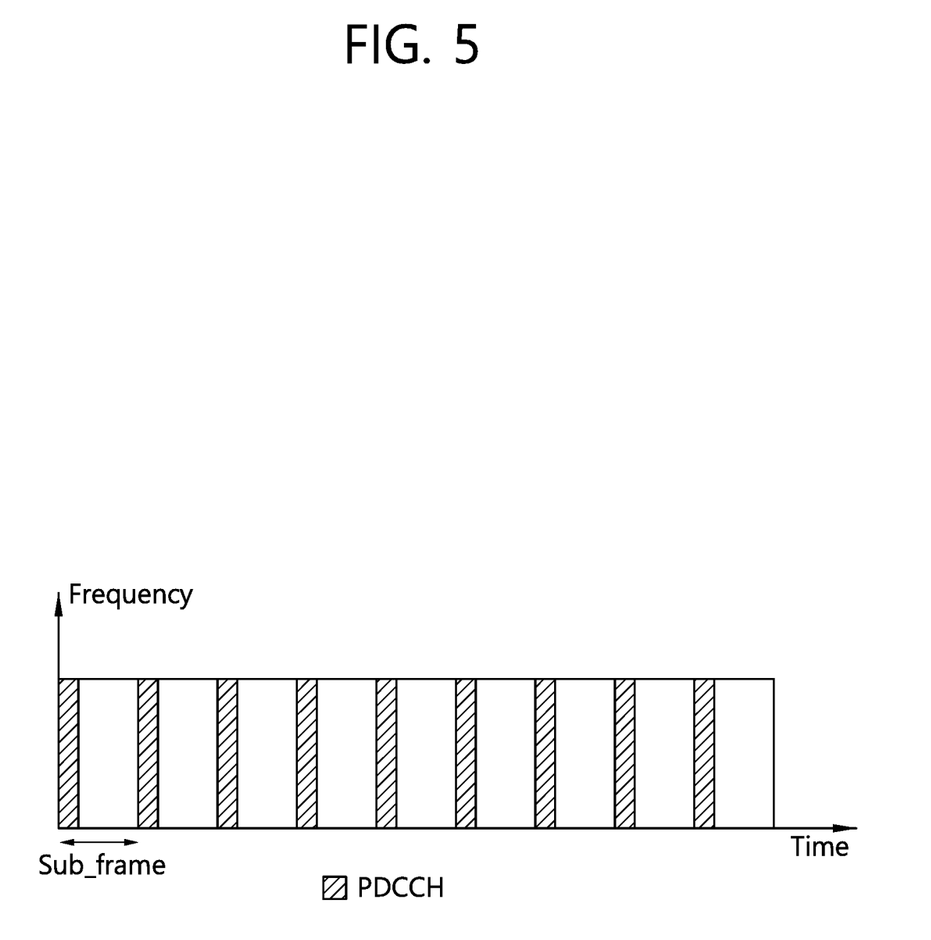
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

In an LTE system, there are multiple components contributing to the total end to end delay for connected UEs. The limitations in performance are in general use case dependent, for which, e.g. UL latency may influence the DL application performance and vice versa. Examples of sources to latency are listed below.

(1) Grant acquisition: A UE with data to send must send a scheduling request (SR) and receive a scheduling grant before transmitting the data packet. In order to send a SR, it must wait for a SR-valid PUCCH resource and a corresponding scheduling grant transmitted to the UE in response. When the grant is decoded the data transmission can start over PUSCH.

(2) Random access: If the UL timing of a UE is not aligned, initial time alignment is acquired with the random access procedure. The time alignment can be maintained with timing advance commands from the eNB to the UE. However, it may be desirable to stop the maintenance of UL time alignment after a period of inactivity, thus the duration of the random access procedure may contribute to the overall latency in RRC_CONNECTED. The random access procedure also serves as an UL grant acquisition mechanism (random access based scheduling request). Therefore, for cases where random access is needed, no separate PUCCH based SR procedure/step is needed.

(3) Transmission time interval (TTI): The transmission of a request, grant, or data is done in subframe chunks with a fixed duration (1 ms), which is the source of a delay per packet exchange between the UE and the eNB.

(4) Processing: Data and control need to be processed (e.g. encoded and decoded) in the UE and eNB. Data processing is a source of processing delays, which are proportional to the transport block (TB) size. The processing of control information is typically less dependent on TB size.

(5) HARQ round trip time (RTT): For UL transmission in frequency division duplex (FDD), the HARQ acknowledgement (ACKK) for a packet received by the eNB in subframe n is reported in subframe n+4. If a retransmission is needed by the UE, this is done in subframe n+8. Thus, the HARQ RTT is 8 ms for FDD UL. For time division duplex (TDD), RTT depends on TDD configuration. The RTT for DL transmissions is not specified in detail, as the HARQ scheme is asynchronous. The HARQ feedback is available at subframe n+4 in FDD, and retransmissions can typically be scheduled in subframe n+8 or later if needed.

(6) Core/Internet: In the core network, packets can be queued due to congestion and delayed due to transmission over backhaul links. Internet connections can be congested and therefore add to the experienced end-to-end packet delay. EPC and/or Internet delays vary widely. In the context of latency reductions, it is reasonable to assume that latency performance of the transport links is good.

For example, Table 1 shows a typical radio access latency components for a UL transmission from a UE without a valid UL grant.

TABLE 1

| Component | Description | Time (ms) |
|---|---|---|
| 1 | Average waiting time for PUCCH (10 ms SR period/1 ms SR period) | 5/0.5 |
| 2 | UE sends SR on PUCCH | 1 |
| 3 | eNB decodes SR and generates the scheduling grant | 3 |
| 4 | Transmission of scheduling grant | 1 |
| 5 | UE processing delay | 3 |

TABLE 1-continued

| Component | Description | Time (ms) |
|---|---|---|
|  | (decoding of scheduling grant + L1 encoding of UL data) |  |
| 6 | Transmission of UL data | 1 |
| 7 | Data decoding in eNB | 3 |
|  | Total delay (ms) | 17/12.5 |

Referring to Table 1, assuming Rel-8 functionality, the average waiting time for a PUCCH at a periodicity of 10 ms is 5 ms, leading to a radio access latency sum of 17 ms. With a SR period set to 1 ms, the average waiting time is reduced to 0.5 ms, which would lead to a sum of 12.5 ms.

Table 2 shows a typical radio access latency components for a DL transmission.

TABLE 2

| Component | Description | Time (ms) |
|---|---|---|
| 1 | Processing incoming data | 3 |
| 2 | TTI alignment | 0.5 |
| 3 | Transmission of DL data | 1 |
| 4 | Data decoding in UE | 3 |
|  | Total delay (ms) | 7.5 |

From the tables, it can be seen that grant acquisition delay, transmission and data processing times are additive.

Existing means to limit latency may include short SR period, pre-scheduling of scheduling grants, semi-persistent scheduling (SPS), etc. However, each of these existing means to limit latency may have drawbacks. With a short SR period, e.g. 1 ms, the control plane overhead is increased which may reduce resource efficiency as more PUCCH resources in the cell to support the same number of users is needed. In addition, PUCCH resources are assigned and reconfigured with dedicated RRC signaling. Pre-scheduling of scheduling grants uses PDCCH resources, and the granted PUSCH resources cannot be used by other UEs, which may limit the radio resource utilization. Further, the UE is expected to send a zero padded transmission also if the buffer of the scheduled UE is empty. With SPS, periodic UL/DL resources can currently not be configured more frequently than every 10 subframes. Also with UL SPS, the UE is expected to send zero padded transmissions that may come with associated inefficient UE battery performance and increased UL interference.

In order to reduce latency, short TTI which may be shorter than current TTI (i.e. 1 ms) has been considered. For example, length of short TTI may be one of 1/2/3/4/7 symbols. When a short TTI is introduced for latency reduction in LTE, E-UTRAN may be configured with both normal TTI with 1 ms and short TTI with a value less than 1 ms, such as 1 symbol or 0.5 ms. Currently, it is unclear how the UE receives system information (SI) messages and paging message in short TTI, e.g. for connection establishment.

In order to solve the problem described above, a method for receiving SI messages and/or paging according to an embodiment of the present invention is proposed. According to an embodiment of the present invention, the eNB may schedule separate SIB1 and/or SI messages broadcast in short TTI. According to another embodiment of the present invention, the MME may store support of short TTI for a UE. When the MME pages the UE, the MME may indicate support of short TTI to the eNB. Then, the eNB may transmit the paging to the UE in short TTI.

Figure 6:
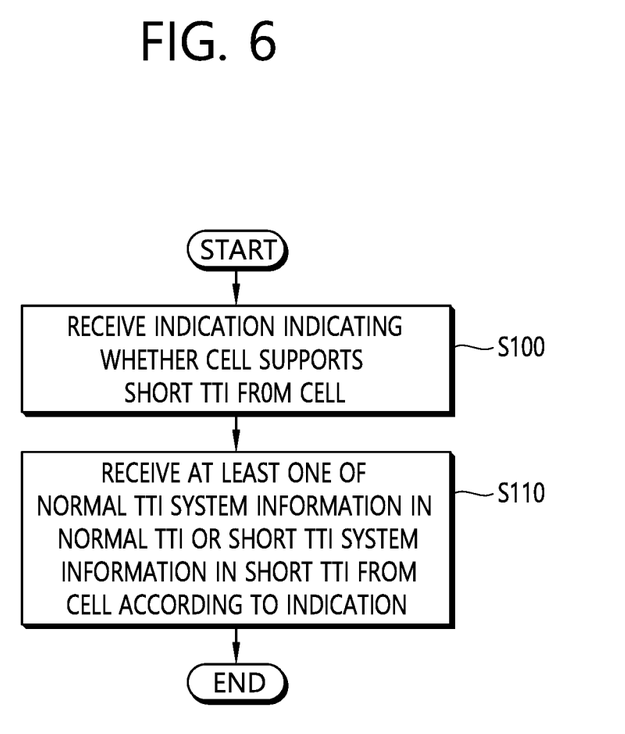
FIG. 6 shows a method for receiving, by a UE, system information according to an embodiment of the present invention.

FIG. 6 shows a method for receiving, by a UE, system information according to an embodiment of the present invention.

In step S100, the UE receives an indication indicating whether a cell supports a short TTI from the cell. The short TTI corresponds to a value less than 1 ms, which corresponds to the normal TTI. The indication may be received via a master information block (MIB) or a system information block type 1 (SIB1).

In step S110, the UE receives at least one of normal TTI system information in a normal TTI or short TTI system information in the short TTI from the cell according to the received indication. The short TTI system information may be received separated from the normal TTI system information. That is, the eNB may schedule separate SIB1/SI messages broadcast in short TTI. Only the short TTI system information may be received if the cell supports short TTI. The UE may apply the received at least one of the normal TTI system information or the short TTI system information.

Further, a set of multicast broadcast single-frequency network (MBSFN) subframes among all MBSFN subframes at a cell may be configured for DL transmissions in short TTI (or in both normal TTI and short TTI). The set of MBSFN subframes may be configured via system information.

Figure 7:
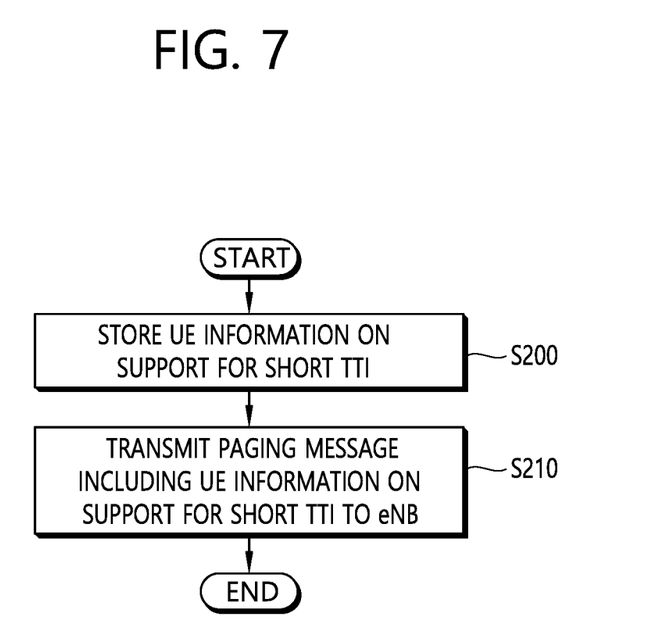
FIG. 7 shows a method for transmitting, by a MME, a paging message according to an embodiment of the present invention.

FIG. 7 shows a method for transmitting, by a MME, a paging message according to an embodiment of the present invention.

In step S200, the MME stores UE information on support for a short TTI. The UE information on support for short TTI may be received from a UE or eNB. The short TTI corresponds to a value less than 1 ms, which corresponds to the normal TTI. Connection may be released.

In step S210, the MME transmits a paging message including the UE information on support for short TTI to the eNB. The paging message may include a UE identity. That is, when the MME pages the UE, the MME indicates UE information on support for short TTI to the eNB. Then, the eNB transmits the paging message to the UE in short TTI.

Figure 8:
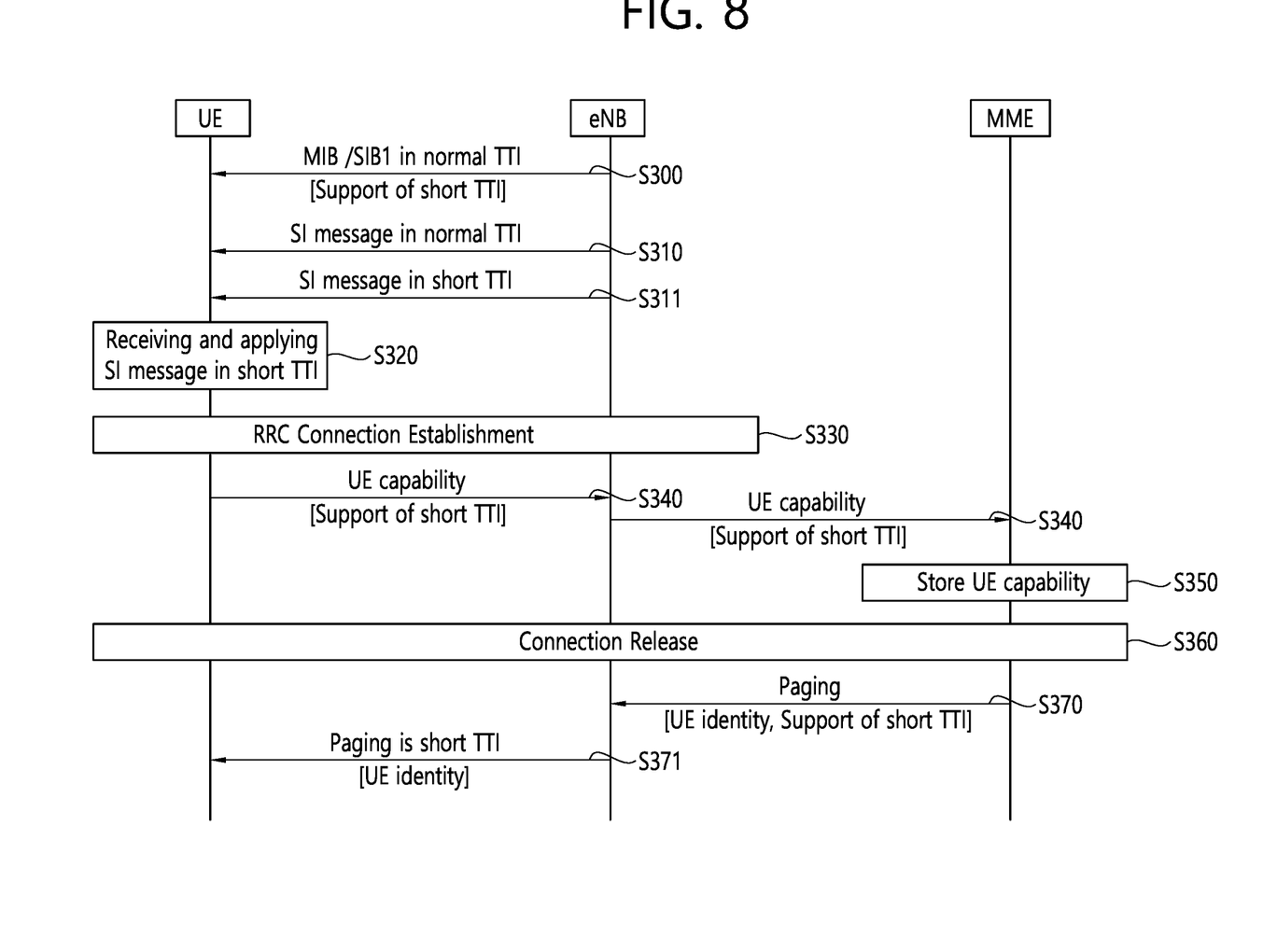
FIG. 8 shows an example of transmission/reception of system information and paging in a short TTI according to an embodiment of the present invention.

FIG. 8 shows an example of transmission/reception of system information and paging in a short TTI according to an embodiment of the present invention.

In step S300, the eNB transmits an indication indicating whether the cell supports short TTI to the UE. The indication may be provided via MIB or SIB1.

In step S310, the eNB transmits SI message in normal TTI to the UE. In step S311, the eNB transmits SI message in short TTI to the UE. If the MIB indicates whether the cell supports short TTI, one new SIB1 message and/or one or more new SI messages may be transmitted in short TTI, while one legacy SIB1 message and/or one or more legacy SI messages may be transmitted in normal TTI. New SIB1/SI messages may be only used by UEs supporting short TTI at the cell. Or, if the SIB1 indicates whether the cell supports short TTI, one or more new SI messages may be transmitted in short TTI, while one or more legacy SI messages may be transmitted in normal TTI. New SI messages may be only used by UEs supporting short TTI at the cell. If the UE supports short TTI and if the cell indicates supports of short TTI, the UE may only receive SIB1 message and/or SI messages in short TTI. In step S320, the UE applies the SI messages received in short TTI.

Further, the cell may configure some MBSFN subframes (i.e. a set of MBSFN subframes) for short TTI among all MBSFN subframes. This configuration may be known to UEs via system information. If the UE supports short TTI, the UE may consider that DL transmissions in the set of MBSFN subframes are performed in short TTI while DL transmissions in other subframes are performed in normal TTI.

In step S330, the UE and eNB establishes RRC connection. In step S340, the UE or eNB informs the MME about whether or not the UE supports short TTI. The support of short TTI may be informed via UE capability information. If the UE supports short TTI, in step S350, the MME stores UE information on support for short TTI. In step S360, connection is released.

Then, in step S370, when the MME transmits a paging message to the eNB for the UE, the MME indicates the UE information on support for short TTI to the eNB so that the eNB transmits the paging message to the UE in short TTI. The paging message may include a UE identity. If the UE camps on a cell and if the cell indicates that short TTI is supported, in step S371, the UE monitors and receives paging message in short TTI. Then, if the paging message including the UE identity is received in short TTI, the UE performs random access in short TTI, e.g. by using RACH resources in short TTI.

Figure 9:
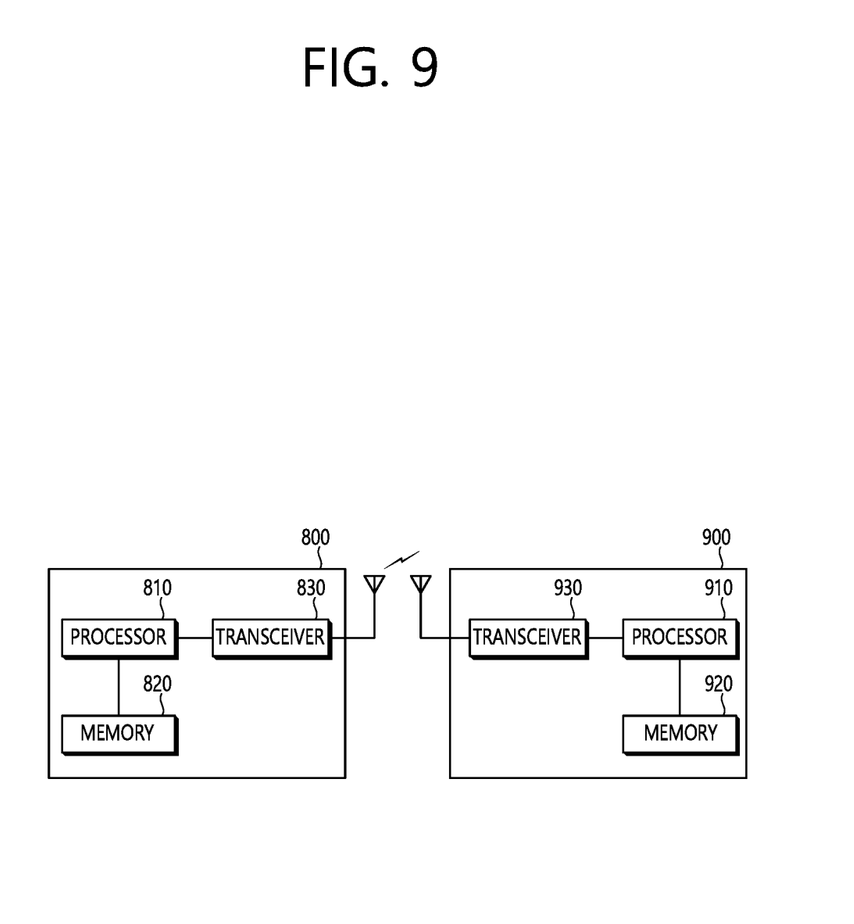
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may control the transceiver 930 to receive an indication indicating whether a cell supports a short TTI from the cell, and to receive at least one of normal TTI system information in a normal TTI or short TTI system information in the short TTI from the cell according to the received indication. The short TTI system information may be configured separated from the normal TTI system information. The short TTI may correspond to a value less than 1 ms, which corresponds to the normal TTI. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) supporting both a short transmission time interval (TTI) and a normal TTI in a wireless communication system, the method comprising:
    receiving, in the normal TTI, information informing the UE that a cell supports both the short TTI and the normal TTI via a master information block (MIB) or a system information block type 1 (SIB1) broadcasted in the cell; and
    selecting the short TTI among the short TTI and the normal TTI, upon receiving the information;
    receiving, based on the selected short TTI from the cell, system information transmitted in both the short TTI and the normal TTI,
    wherein the normal TTI is 1 ms, and
    wherein the short TTI is a value less than 1 ms.

2. The method of claim 1, wherein the short TTI system information is received separated from the normal TTI system information.

3. The method of claim 1, wherein a set of multicast broadcast single-frequency network (MBSFN) subframes among all MBSFN subframes is configured for the short TTI.

4. The method of claim 3, wherein the set of MBSFN subframes is configured via system information.

5. The method of claim 3, wherein the short TTI system information is received in the set of MBSFN subframes.

6. The method of claim 1, further comprising applying at least one of the normal TTI system information or the short TTI system information.

7. A method for transmitting, by a mobility management entity (MME), a paging message in a wireless communication system, the method comprising:
    storing UE information for support of a short transmission time interval (TTI); and
    transmitting a paging message including the UE information for support of the short TTI to an eNodeB (eNB).

8. The method of claim 7, wherein the short TTI corresponds to a value less than 1 ms.

9. The method of claim 7, further comprising:
    receiving the UE information for support of the short TTI from a user equipment (UE) or the eNB, before storing the UE information.

10. The method of claim 7, wherein the paging message includes a UE identity.

11. The method of claim 7, further comprising:
    releasing a connection before transmitting the paging message.

* * * * *